Figure 1:
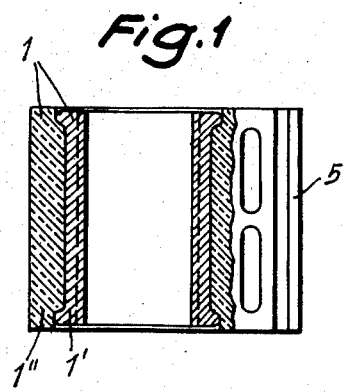

United States Patent
Hussauf

[15] 3,650,548
[45] Mar. 21, 1972

[54] PIPE-SPACING DEVICE FOR USE IN MAKING WALL-BATTERIES OF COLD-WATER AND HOT-WATER PIPING CONNECTIONS

[72] Inventor: Walter Hussauf, 8497 Fischenthal, Kt. Zurich, Switzerland

[22] Filed: Dec. 12, 1969

[21] Appl. No.: 884,415

[30] Foreign Application Priority Data

Aug. 22, 1969 Switzerland..........................12669/69

[52] U.S. Cl..................................285/3, 285/55, 285/64, 285/137 R, 285/156, 285/179, 285/188
[51] Int. Cl.............................................F16l 39/00
[58] Field of Search..................285/188, 137, 55, 156, 179, 285/61, 64, DIG. 22, 137 R, 3; 138/112, 116, 106, 107, 103, 115, 117, 111, 96; 46/29, 28, 27; 287/54 C

[56] References Cited

UNITED STATES PATENTS

| | | | |
|---|---|---|---|
| 1,165,530 | 12/1915 | Mueller et al. | 138/107 |
| 1,579,159 | 3/1926 | Spikings | 287/54 C |
| 1,918,116 | 7/1933 | Mansfield | 287/54 C X |
| 2,546,979 | 4/1951 | Cozzone | 287/54 C |
| 2,646,822 | 7/1953 | Ferguson | 285/55 |
| 3,021,159 | 2/1962 | Back | 46/29 X |
| 3,086,629 | 4/1963 | Blitzer | 138/117 X |
| 3,160,175 | 12/1964 | Laemmle | 138/96 |
| 3,375,856 | 4/1968 | Howard et al. | 138/106 |
| 3,526,934 | 9/1970 | Owen | 138/111 X |

Primary Examiner—Thomas F. Callaghan
Attorney—Karl F. Ross

[57] ABSTRACT

A pipe-spacing device, comprises a sleeve of nonmetallic (synthetic-resin) material in which a metallic sleeve is embedded to receive the ends of a pair of pipes. The outer synthetic-material sleeve is formed with a T-profile axially extending formation receivable in a channel extending along a side of a generally rectangular spacer element provided with at least two such channels and with means enabling the device to be affixed to a support. The channels have overhanging ledges.

7 Claims, 29 Drawing Figures

WALTER HUSSAUF
INVENTOR.

BY

ATTORNEY

WALTER HUSSAUF
INVENTOR.

BY

ATTORNEY

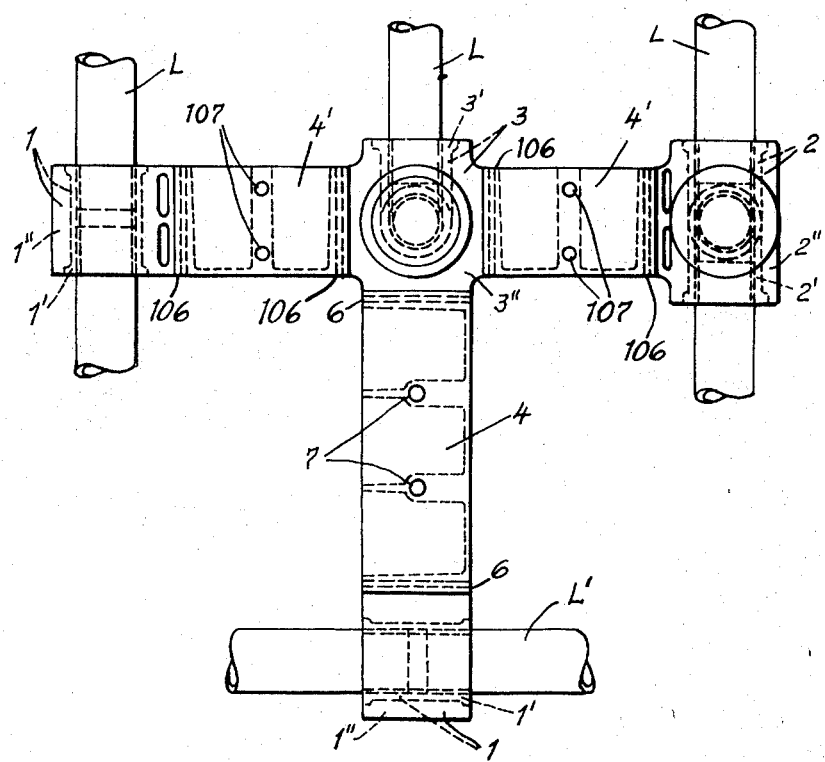
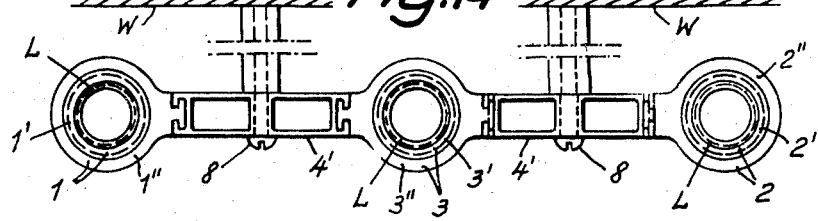

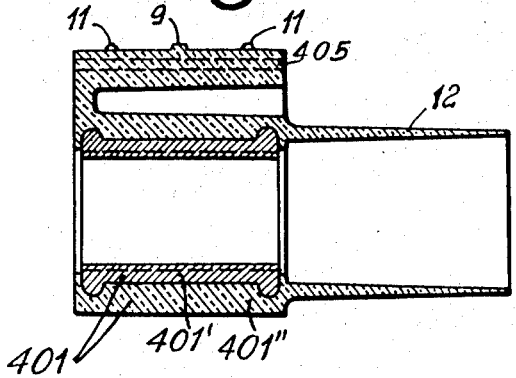
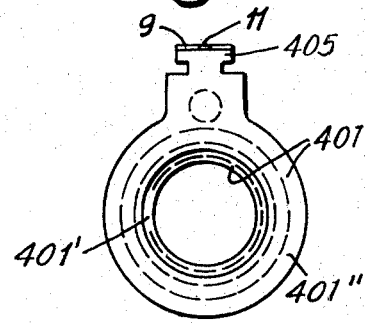
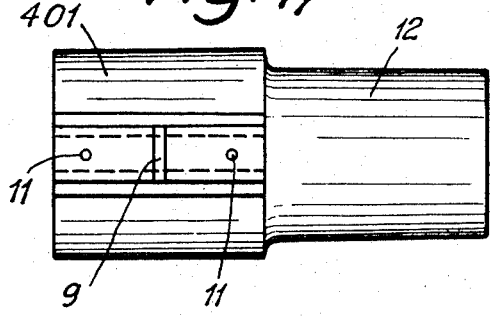
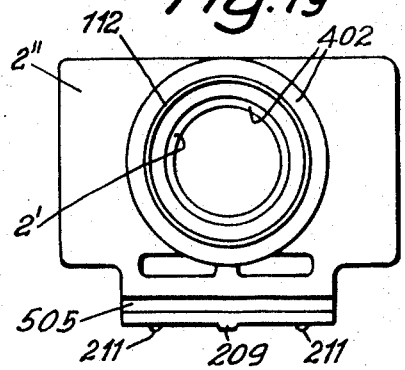
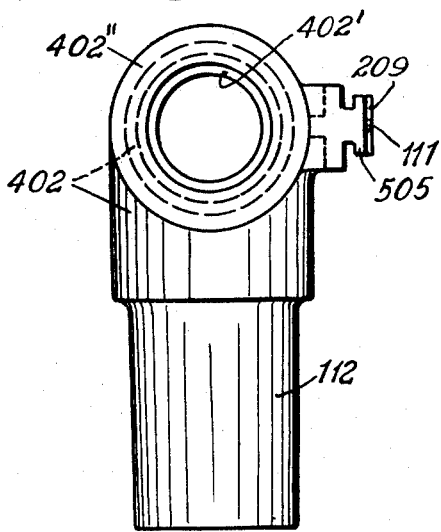
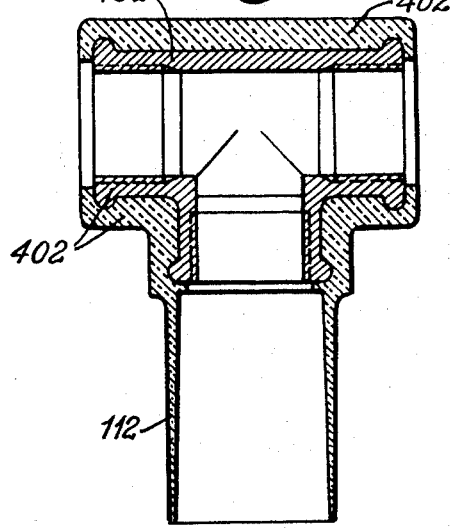

Patented March 21, 1972

3,650,548

5 Sheets-Sheet 5

WALTER HUSSAUF
INVENTOR.

BY

ATTORNEY

PIPE-SPACING DEVICE FOR USE IN MAKING WALL-BATTERIES OF COLD-WATER AND HOT-WATER PIPING CONNECTIONS

For cold-water and hot-water piping batteries, fittings and brass spacers connected therewith are made use of for determining the position of the pipes with respect to each other. Fixing of the pipelines for water connections is only possible with the help of a battery gauge. For prefabricated installations it is necessary to make use of a special frame, by which the piping connections can be accurately established. This frame must later be removed.

The present invention relates to a pipe-spacing device for use in making wall batteries of cold-water and hot-water piping connections, with which device it is possible to fix the latter without a battery gauge and without the aid of a holder frame, and thus effect a great saving in working time.

According to the invention, this is achieved by a pipe spacing device comprising connecting sleeves which are provided on at least one side with coupling pieces and have allocated thereto spacing holders of different lengths and fitted at the front ends with countercoupling pieces into which the coupling pieces of the connecting sleeves engage.

Figure 3:
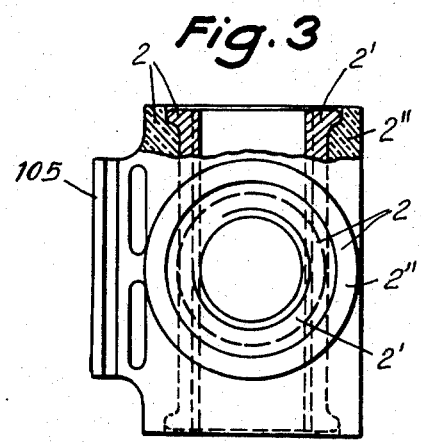
Figure 2:
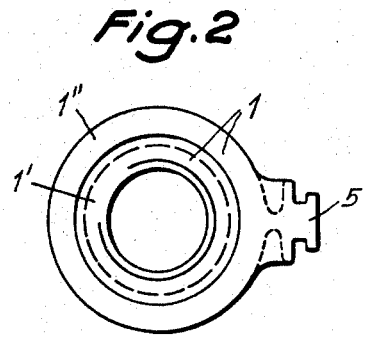
Figure 4:
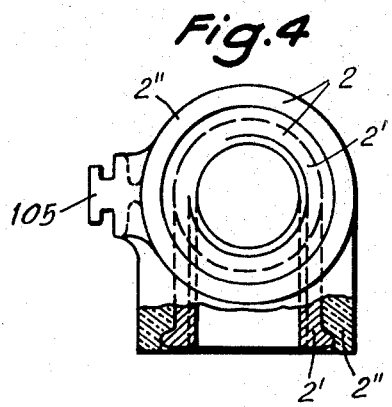
Figure 5:
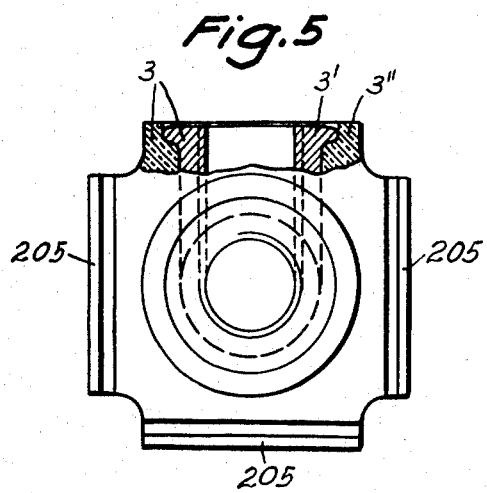
Figure 6:
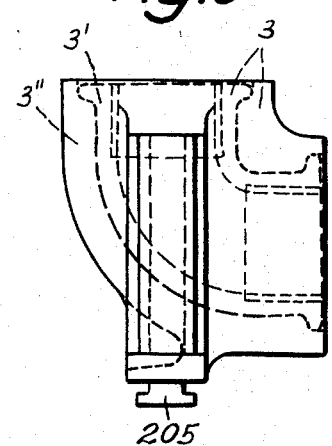
Figure 7:
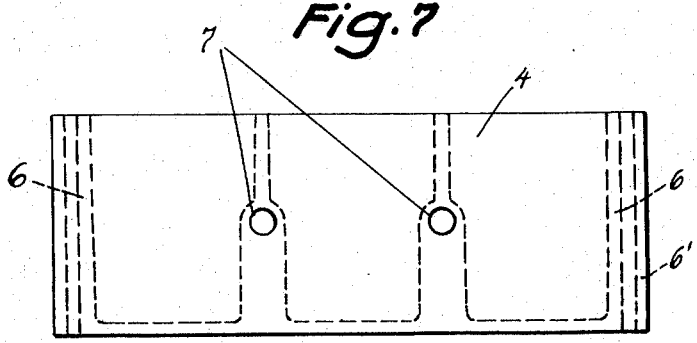
Figure 8:
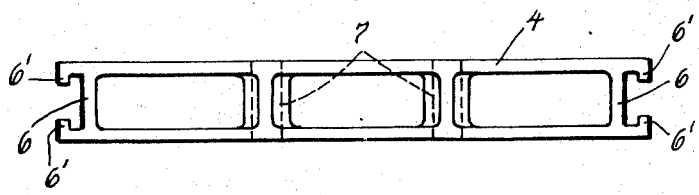
Figure 9:
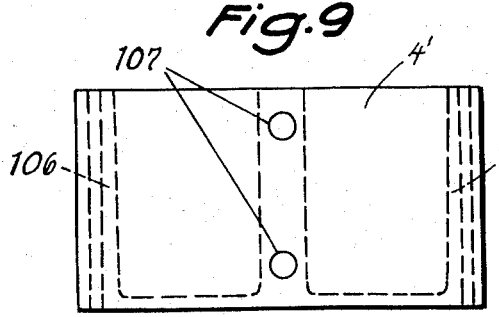
Figure 11:
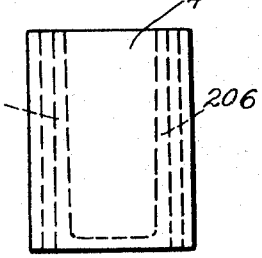
Figure 10:
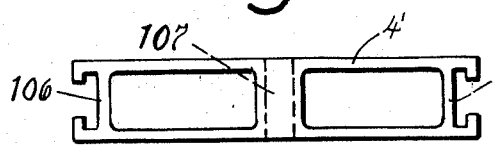
Figure 12:
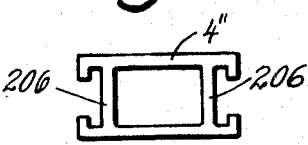
Figure 21:
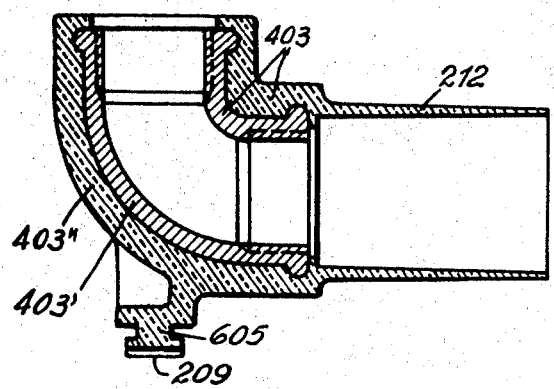
Figure 22:
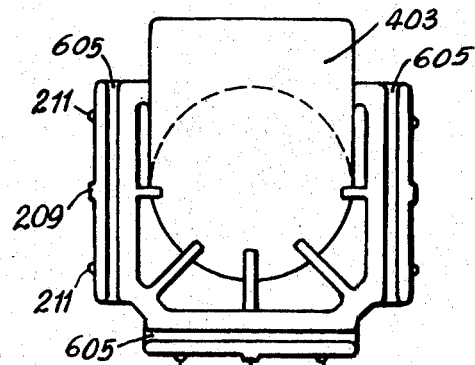
Figure 23:
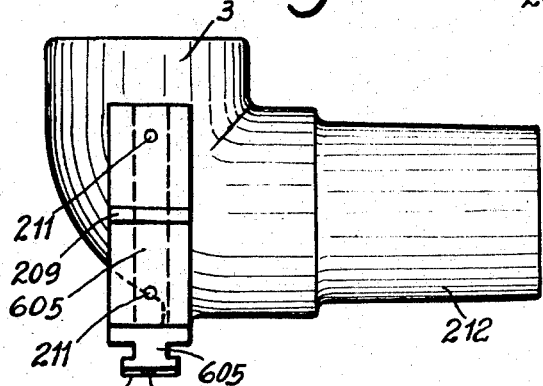
Figures 24, 25:
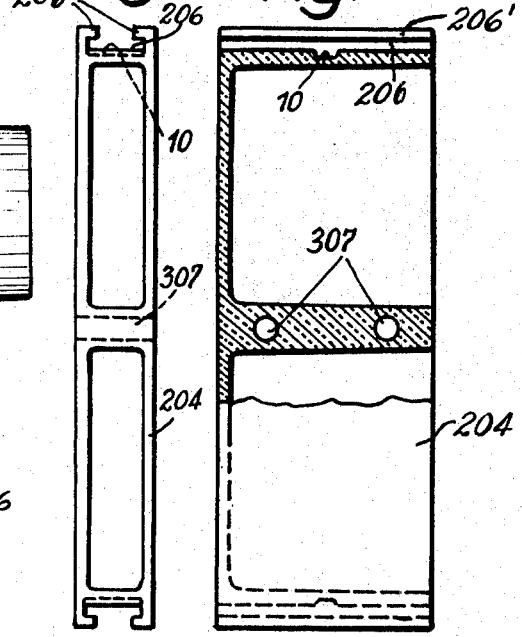
Figures 26, 27:
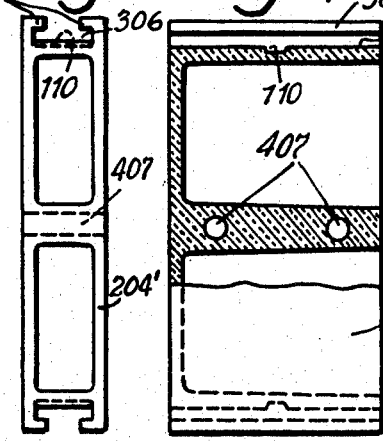
Figures 28, 29:
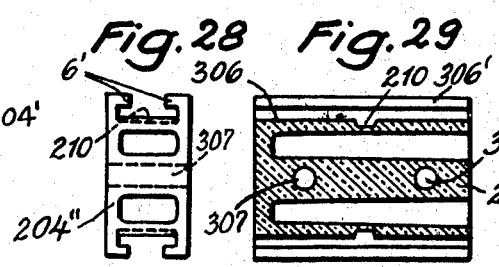

The accompanying drawing shows by way of example some embodiments incorporating the invention, and wherein:

FIG. 1 shows a view with a partial section of a connecting sleeve for through-going pipe lines, FIG. 2 is a top view of the device of FIG. 1, FIG. 3 is a view in partial section of a connecting sleeve for a pipeline branch, FIG. 4 is a top view of the device of FIG. 3, in partial section, FIG. 5 is a view in partial section of an angle-sleeve for a pipe angle connection, FIG. 6 is a side view of the device of FIG. 5, FIGS. 7 and 8 show an elevational view and a top view, respectively of a long spacer piece, FIGS. 9 and 10 show an elevational view and a top view, respectively of a medium-sized spacer, FIGS. 11 and 12 show an elevational view and a top view, respectively of a short spacer, FIG. 13 is a part view of a wall battery with pipelines fixed with respect to each other by connecting sleeves and spacers, FIG. 14 is a top view of the device of FIG. 13, FIG. 15 is an axial section of a connecting sleeve for pipes to be connected coaxially with each other, the sleeve being provided with additional elements, FIG. 16 is a top view of the device of FIG. 15, FIG. 17 is a front elevational view of the device of FIG. 15, FIG. 18 is an axial section through a connecting sleeve for a pipeline branch, FIG. 19 is a front elevational view of the device of FIG. 18, FIG. 20 is a side elevation of the device of FIG. 18, FIG. 21 shows an axial section of an angle-sleeve for a pipe-angle connection, FIG. 22 is a side elevation of the device of FIG. 21, FIG. 23 is a view of the pipe-angle sleeve, FIGS. 24 and 25 are a side view and a partial sectional view of a long spacer, FIGS 26 and 27 are a side view and a partial sectional view of a medium-sized spacer, and FIGS. 28 and 29 are a side view and a partial sectional view of a short spacer.

In the drawing parts of similar functions are designated with the same reference numerals preceded by different "hundreds" integers.

Referring to FIGS. 1–6, the pipe-spacing device shown includes connecting sleeves 1,2,3 which are kept apart from each other by spacers 4,4',4" of different lengths according to FIG. 7 through 12. Said sleeves consist each of a pipe; insert 1',2',3' which is embedded in a jacket 1",2",3" made of synthetic material. The sleeves 1 and 2 are provided at one side with a T-profile 5,105,205, while on sleeve 3 there is arranged a T-profile 5,105,205 at each of the two sides and also below. The T-profiles 5,105,205 serve as coupling pieces for fixing to the spacers 4,4',4" which in turn are each provided at their front ends with a substantially U-shaped profile 6,106,206 with inwardly bent-down profile arms 6'. The spacers 4,4',4" with their U-profile grooves can be pushed into the T-profiles 5 of the connecting sleeves 1,2,3 as illustrated in FIGS. 13 and 14. The spacers 4,4',4" have to be provided in various lengths of, say, 28,72 and 105 mm. As shown in FIG. 13, three vertical pipes L and a horizontal pipe L' are kept apart with respect to each other by means of connecting sleeves 1,2,3 and, as shown in FIG. 14, are mounted on a wall W by means of fixing screws 8 which pass through the spacers in fixing holes 7,107. The sleeves 1,2,3 may be laid to all sides and spaces in all directions.

In the represented further design of the pipe spacing device according to FIGS. 15 through 29, the sleeves 401,402,403 containing the pipe-inserts 401',402',403 have coupling pieces of substantially T-shaped profile 405,505,605 on their synthetic-substance jackets 401",403",402" surrounding the pipe-inserts 401',402',403'. The spacers 204, 204', 204" are provided at both their ends with countercoupling pieces 206,206',204" for engaging with the coupling pieces 405,505,605. The countercoupling pieces 206,306,406 have a substantially U-shaped profile with inwardly bent-down profile shoulders 6'.

The connecting of the sleeves 1,2,3, etc., with the spacers 204,204',204, is effected by pushing the T-profiles 5 into the counterprofiles 206,206', etc.

For locking the position of the profiles in the middle of the whole sliding track, there is provided a notch connection 9,10;109,110;209,210; of the coupling pieces 5,6,6';605, 206,206'; etc. This notch connection is a groove and tongue construction, the tongue 9 being arranged in the middle on the outside of the T-profile piece 5,605,etc., and transverse to the direction of movement, while the groove 10,110,etc., is made at he bottom of the U-profile 6,6', etc., of the spacer 204,204',204". On the pushing the T-profile into the U-profile 206,206', etc., the tongue 9 falls into the notch groove 10, when the middle position of the pushing movement is reached.

For eliminating the play necessary to facilitate erecting of the coupling parts 5,6,6', etc., that are pushed into each other, there are provided cams 11,111, etc., on the outside of the shoulder of the T-profile 5,105, etc., at a distance from the notch tongue 5,105,etc. In the erected position of the coupling parts said cams rest resiliently on the bottom of the groove of the U-profile 6, thus ensuring connection free from play.

In order to facilitate erection, the sleeves 1,2,3, etc., may be provided at one of their connecting ends with a tapered mouthpiece 12,112,212, etc., which is thin-walled and therefore easy to cut away.

Having now particularly described and ascertained the nature of my said invention and in what manner the same is to be performed, I declare that what I claim is:

1. A pipe-spacing device comprising at least two bodies of synthetic material formed with bores adapted to receive ends of pipes sealingly insertable therein, and with at least one longitudinally extending T-cross section formation along a side of the respective body, and a spacing member formed with at least one pair of channels complementarily receiving said formations and extending along sides of said member, said channels each having a pair of overhanging ledges engageable behind said formation, said channels each being formed with a transverse groove at an intermediate location therealong and said formations each being provided with a transverse protuberance receivable in a respective one of said grooves upon interfitting of said formations and said channels.

2. The device defined in claim 1, further comprising a metal sleeve embedded in each of said bodies and defining the respective bore and engageable with respective pipe ends, said bodies each having a thin-walled tubular portion projecting beyond said sleeve and adapted to be severed from said body.

3. The device defined in claim 2 wherein said thin-walled tubular portion is of axially tapering cross section away from said metal sleeve.

4. The device defined in claim 1 wherein said protuberance is formed on the head of the formation along the outer surface thereof and said groove is formed in the bottom of the respective channel.

5. A pipe-spacing device, comprising at least two bodies of synthetic material; respective sleeves embedded in said bodies and defining respective bores for sealing engagement of respective pipe ends in said sleeves, said bodies each being formed with at least one T-profile formation extending longitudinally along the body parallel to an axis of the respective bore; a generally rectangular spacer member of synthetic material formed along a pair of opposite edges with longitudinally extending formations of T-profile matingly engageable with the formations of said bodies in a tongue-and-groove connection, one of the formations each matingly engageable pair being provided with inwardly turned ledges engageable behind the other formation of the pair; and a thin-walled tubular extension of synthetic material formed unitarily on one of said bodies and projecting axially beyond the respective sleeve in alignment with the bore thereof and adapted to be severed from said respective body.

6. The device defined in claim 5 wherein the formations of said bodies are T-cross section male projections and the formations of said member are channels formed therein.

7. The device defined in claim 6, further comprising a protuberance formed in one of the formations of each matingly engageable pair at an intermediate location along the length thereof and a respective recess formed on the other formation of each matingly engageable pair for receiving said protuberance.

* * * * *